United States Patent [19]

Hobbs, Jr.

[11] Patent Number: 5,566,708

[45] Date of Patent: Oct. 22, 1996

[54] VALVE CONNECTOR SYSTEM FOR PLASTIC PIPE

[75] Inventor: Billy J. Hobbs, Jr., Gardnerville, Nev.

[73] Assignee: LSP Products Group, Inc., Carson City, Nev.

[21] Appl. No.: 557,602

[22] Filed: Nov. 14, 1995

[51] Int. Cl.$^6$ ................ F16L 5/00; F16L 17/00
[52] U.S. Cl. .................. 137/360; 251/148; 285/174; 285/354
[58] Field of Search ................. 285/354, 172, 285/174; 137/360; 251/148

[56] References Cited

U.S. PATENT DOCUMENTS

| | | | |
|---|---|---|---|
| 100,665 | 3/1870 | Potter . | |
| 2,521,127 | 9/1950 | Price . | |
| 2,672,924 | 3/1954 | Anthes | 158/27.4 |
| 3,167,333 | 1/1965 | Hall et al. | 285/140 |
| 3,311,391 | 3/1967 | Harrell | 285/58 |
| 3,482,859 | 12/1969 | Bowlin | 285/332.3 |
| 3,533,649 | 10/1970 | Williams | 285/354 |
| 4,332,402 | 6/1982 | Shellhause | 285/86 |
| 4,564,249 | 1/1986 | Logsdon | 137/360 |
| 4,682,797 | 7/1987 | Hildner | 285/40 |
| 4,802,695 | 2/1989 | Weinhold | 285/91 |
| 5,024,419 | 6/1991 | Mulvey | 251/148 |
| 5,060,988 | 10/1991 | Williamson | 285/332.3 |
| 5,143,381 | 9/1992 | Temple | 277/1 |
| 5,305,785 | 4/1994 | Humber | 137/360 |

OTHER PUBLICATIONS

Front and back cover of LSP Plumbing Specialites 1995 Catalog with an effective date of Jan. 1, 1995, printed in Nov. 1994, 4 pages.

Flyer of LSP Specialty Products Co. printed in Nov. 1994, 1 page.

*Primary Examiner*—A. Michael Chambers
*Attorney, Agent, or Firm*—Ross, Clapp, Korn & Montgomery, L.L.P.

[57] ABSTRACT

A valve connector system for attaching a metal or plastic valve to a plastic pipe, the system including a valve with an externally threaded inlet port, a tubular adapter having an annular flange and a sealing member, a threaded lock nut for attaching the adapter to the valve, and a tubular plastic coupling for use in cementing the free end of the tubular adapter to the free end of the plastic pipe. The annular flange of the tubular adapter preferably abuts against the open end of the valve inlet port and the annular sealing member provides a water-tight seal between the tubular adapter and the inside diameter of the valve inlet port. The threaded lock nut has female threads to engage the externally threaded valve inlet port and an annular flange that abuts against the back side of the annular flange on the tubular adapter to hold the sealing member of the tubular adapter in sealing engagement with the inside diameter of the valve inlet port.

44 Claims, 3 Drawing Sheets

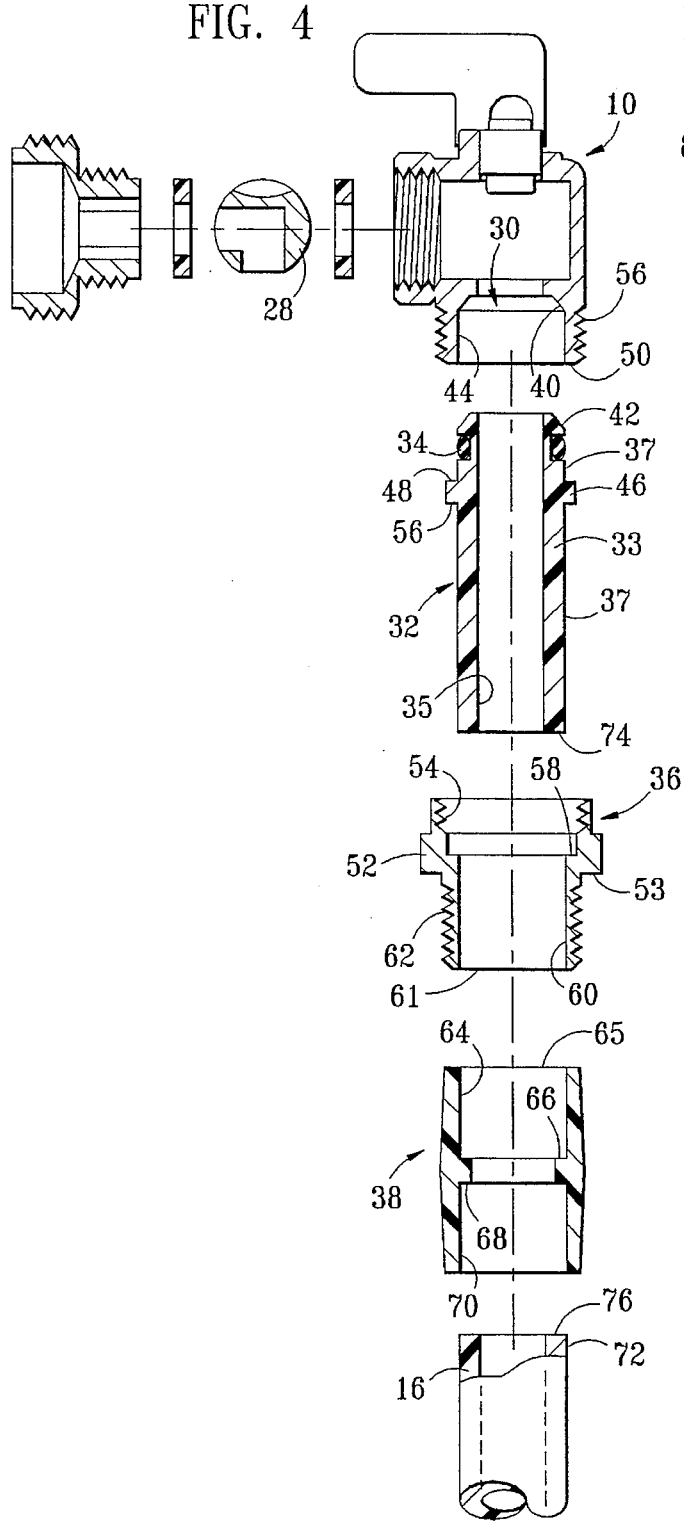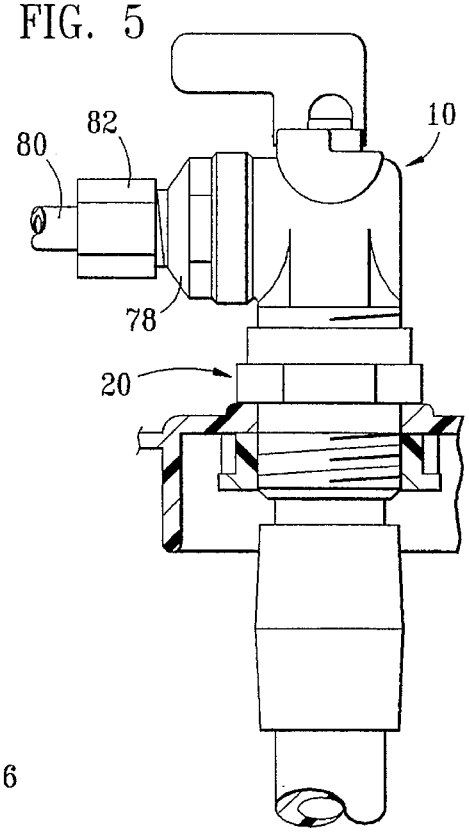

VALVE CONNECTOR SYSTEM FOR PLASTIC PIPE

BACKGROUND OF THE INVENTION

1. Field of the Invention

This invention relates to a system for connecting a plastic pipe such as a water supply line to a valve, and more particularly, to a valve connector system useful for connecting chlorinated polyvinyl chloride ("CPVC") piping to metal or plastic valves in applications such as icemakers, dishwashers, washing machines, and the like.

2. Description of Related Art

The use of plastic pipe for plumbing applications has become widespread. One preferred type of plastic pipe, particularly for use in potable water applications, is plastic pipe made of CPVC. It is well known that cooperatively sized and aligned CPVC pipe segments and fittings can be joined together in permanent, leak-proof joints by the use of commercially available solvent-type adhesives. Difficulties have been encountered, however, when making permanent connections between CPVC pipe segments and valves, especially metal valves. In the past, such connections have been made using a brass compression ring that is press-fitted over a length of CPVC pipe, and have frequently resulted in leaks due to thermal expansion and contraction. There is therefore a need for a reliable valve connector system comprising means for making a permanent, water-tight connection between a CPVC supply line and a metal valve that will not loosen due to thermal expansion and contraction.

Variously coupling devices have previously been disclosed in the following U.S. Pat. Nos.: 2,521,127; 2,672,924; 3,167,333; 3,311,391; 3,482,859; 4,332,402; 4,682,797; 4,802,695; 5,060,988; and 5,143,381. Transition fittings such as those previously used with standard brass compression fittings for connection to valves, water heaters and metal piping are disclosed, for example, in the PLASTIC PLUMBING PRODUCTS catalog of Nibco, Inc. of Elkhart, Ind.

SUMMARY OF THE INVENTION

An improved valve connector system is disclosed herein that is preferred for use in connecting a water supply line made of a polymeric material such as CPVC with a metal or plastic valve. The valve connector system of the invention is useful with many different kinds of valves such as, for example, icemaker valves, dishwasher valves, washing machine valves, angle stop valves, in-line ball valves, gate valves, globe valves, butterfly valves, and the like. According to a particularly preferred embodiment of the invention, the valve is a brass, quarter-turn ball valve. The preferred valve connector system of the invention provides a positive seal between a CPVC supply line and a metal valve that will not loosen due to thermal expansion and contraction.

According to one particularly preferred embodiment of the invention, the valve connector system comprises quarter-turn ball valve with an externally threaded inlet port, a tubular adapter having an annular flange and a sealing member, a threaded lock nut for attaching the adapter to the valve, and a tubular CPVC coupling for use in cementing the free end of the tubular adapter to the free end of a water supply line. The annular flange of the tubular adapter preferably abuts against the open end of the valve inlet port and the annular sealing member provides a water-tight seal between the tubular adapter and the inside diameter of the valve inlet port. The threaded lock nut has female threads to engage the externally threaded valve inlet port and an annular flange that abuts against the back side of the annular flange on the tubular adapter to hold the sealing member of the tubular adapter in sealing engagement with the inside diameter of the valve inlet port. Depending upon the configuration of the tubular adapter, the sealing member is preferably a polymeric O-ring, square O-ring, cone washer, flat washer, or similarly effective means. The sealing member is preferably made of polyethylene or another similarly effective material that is FDA approved if the intended application involves possible contact with potable water.

According to another preferred embodiment of the invention, the tubular adapter and threaded locking nut are molded together as a unitary part from polymeric material such as CPVC.

According to yet another preferred embodiment of the invention, the tubular adapter and threaded locking nut are replaced by a metal adapter fitting made by unitarily forming the sealing and locking portions of those elements. A tubular polymeric shell is formed around or pressed onto the free end of the metal adapter fitting in fixed relationship thereto, and the CPVC coupling can then be cemented to the outside surface of the tubular shell using a solvent type adhesive.

BRIEF DESCRIPTION OF THE DRAWINGS

The apparatus of the invention is further described and explained in relation to the following figures of the drawings wherein:

FIG. 4 is an exploded cross-sectional view of the valve connector system of FIG. 3 (omitting the water hose connector, outlet box and panel nut);

FIG. 5 is a side elevation view of the valve connector system of the invention as adapted for use in connecting an ice maker to CPVC piping;

Like reference numerals are used to indicate like parts in all figures of the drawings.

DESCRIPTION OF THE PREFERRED EMBODIMENTS

Figure 1:
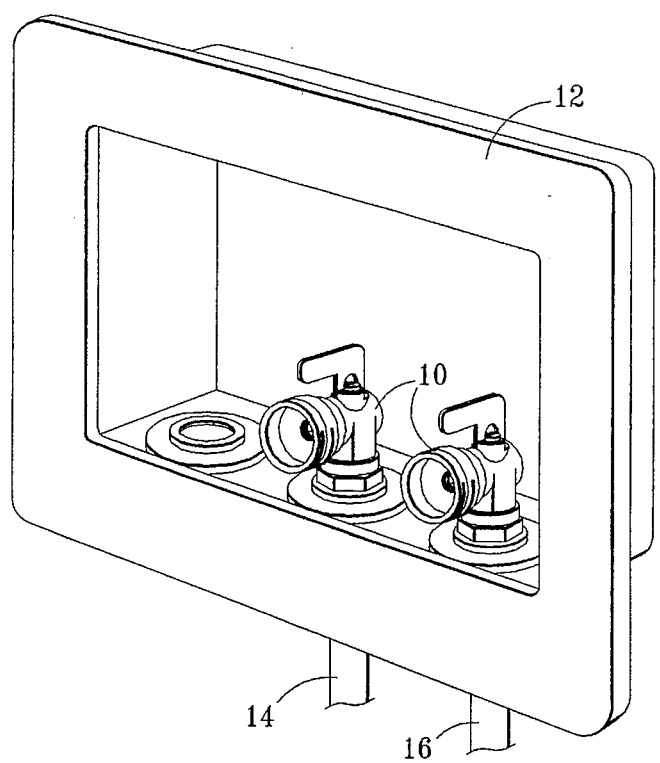
FIG. 1 is a perspective view of a washing machine outlet box depicting hot and cold water valves installed using the valve connector system of the invention.

Referring to FIG. 1, two quarter-turn ball valves 10 are shown installed in washing machine outlet box 12. Hot and cold water supply lines 14, 16 are each attached to one of the respective valves 10. For purposes of the invention disclosed herein, water supply lines 14, 16 are made of a polymeric material, most preferably CPVC. Valves 10 are installed using valve connector system 20 of the invention, which is further described in relation to FIGS. 2–4 below.

Figure 2:
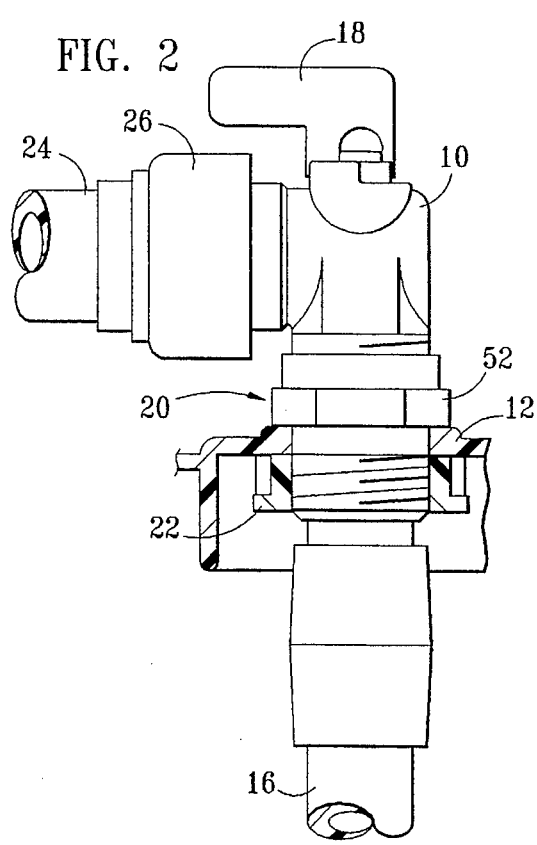
FIG. 2 is a side elevation view of one valve connector system as shown in FIG. 1 with the outlet box broken away.

Referring to FIG. 2, valve connector system 20 is used to connect valve 10 to inlet line 16 through an aperture in the bottom surface of washing machine outlet box 12. Valve connector system 20 is secured inside outlet box 12 using threaded panel nut 22 attached from the underside of the box. According to a preferred embodiment of the invention, valve 10 is a quarterturn ball valve, meaning that the valve can be fully opened or closed by rotating handle 18 through a 90 degree arc. Although valve 10 is preferably made of metal and is most preferably made of brass, it will be understood and appreciated upon reading this disclosure that valve connector system 20 of the invention is similarly useful where valve 10 is a plastic valve as might be molded from a polymeric material such as CPVC. Hose segment 24 is a conventional washing machine hose attached to the outlet port of valve 10 by a rotatable, internally threaded female connector 26.

Figure 3:
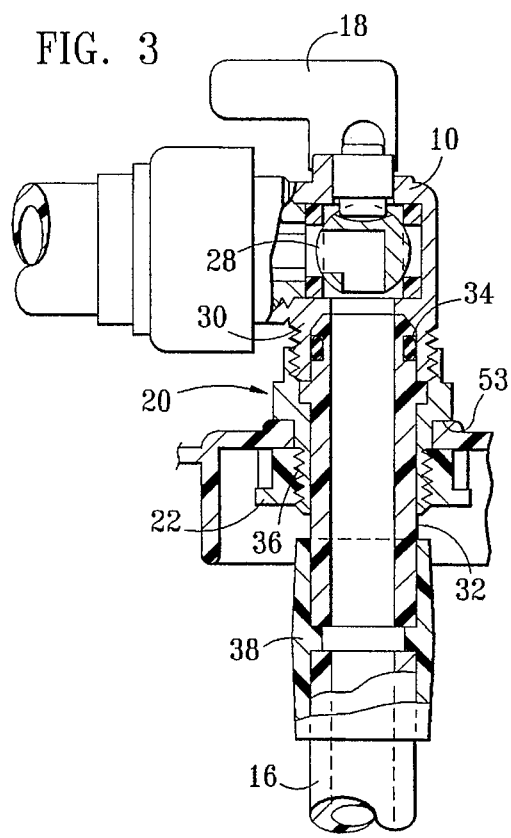
FIG. 3 is a cross-sectional view through the valve connector system of FIG. 2.

Referring to FIG. 3, valve connector system 20 of the invention preferably comprises externally threaded valve port 30, tubular adapter 32 further comprising sealing member 34, elongated lock nut 36, and polymeric coupling 38. Also invisible in FIG. 3 is ball 28 of valve 10, which has been set in the fully open position using handle 18. The detailed structure and operation of valve connector system 20 is further described in relation to FIG. 4, in which valve port 30, tubular adapter 32, elongated lock nut 36 and polymeric coupling 38 are shown exploded in the direction of their common longitudinal axis to facilitate description of their respective parts.

Referring to FIG. 4, valve port 30 preferably comprises external threads 56 and a bore defined by substantially cylindrical inside wall 44 and inwardly tapered wall section 40. Tubular adapter 32 preferably comprises body 33 having a substantially cylindrical outside wall 37 and an axial bore defined by cylindrical inside wall 35. Body 33 preferably further comprises external angular flange 46 having a first annular surface 48 adapted to abut end surface 50 of valve port 30 whenever the upwardly directed end section of tubular adapter 32 is inserted into the bore defined by inside wall 44 of valve port 30. According to a particularly preferred embodiment of the invention as shown in FIGS. 3 and 4, sealing member 34 is a polymeric O-ring retained in an annular groove around body 33 between beveled surface 42 and external flange 46. Sealing members having other configurations and made of other materials can also be used within the scope of the invention, depending upon the configuration of tubular adapter 32. Thus, for example, square O-rings, flat washers, cone washers, or any other similarly satisfactory sealing member 34 capable of performing the sealing function, whether made of polyethylene, another polymeric material, or some other commercially available material useful for the same purposes, can also be used. Sealing member 34 desirably prevents fluid leakage between inside wall 44 of valve port 30 and outside wall 37 of tubular adapter 32 whenever beveled end 42 of tubular adapter 32 is fully seated inside valve port 30 as discussed in greater detail below. Tubular adapter 32 is preferably made of a polymeric material such as CPVC.

Tubular adapter 32 is desirably held in sealing engagement with valve port 30 by elongated lock nut 36, which can be made of metal but is preferably made of a polymeric material such as CPVC. Elongated lock nut 36 preferably comprises an axial bore defined by substantially cylindrical inside wall 60 having a diameter slightly greater than the outside diameter of outside wall 37 of tubular adapter 32. The diameter of inside wall 60 is preferably stepped radially outward to create internal annular surface 58 having a diameter sufficient to receive and seat against annular surface 56 of tubular adapter 32. Elongated lock nut 36 can be made of a polymeric material such as CPVC, another polymeric material, or metal if desired.

Valve port 30, tubular adapter 32 and elongated lock nut 36 are preferably assembled by first inserting end 74 of tubular adapter 32 downward through the interior bore of elongated lock nut 36 until annular surface 56 of external flange 46 on tubular adapter 32 abuts against annular surface 58 of lock nut 36. When tubular adapter 32 is seated inside elongated lock nut 36, the portion of body 33 behind external flange 46 of tubular adapter 32 will extend downward through and beyond lower end 61 of inside wall 60. The upwardly extending end section of tubular adapter 32 is then inserted into and seated inside valve port 30 by urging internal threads 54 of elongated lock nut 36 upwardly and into threaded engagement with external threads 56 of valve port 30. Elongated lock nut 36 is desirably threaded onto valve port 30 until annular surface 48 of tubular adapter 32 is brought to bear against end wall 50 of valve port 30. According to a particularly preferred embodiment of the invention, the maximum permissible insertion of tubular adapter 32 into valve port 30 is limited by the abutting contact between surface 48 of external flange 46 and end surface 50 of valve port 30, and the distance between inwardly tapered surface 40 and end wall 50 of valve port 30 will desirably be slightly greater than the distance between beveled surface 42 and annular surface 48 of tubular adapter 32. This will ensure that the fluid tight seal between tubular adapter 32 and inside wall 44 of valve port 30 is provided by sealing member 34 and not by grinding beveled surface 42 against tapered surface 40, even though beveled surface 42 and tapered surface 40 are cooperatively sized and aligned.

Whenever valve port 30, tubular adapter 32 and elongated lock nut 36 are assembled as described above, a leakproof, fluid-tight connection is established between the interior of valve 10 and the longitudinal bore through tubular adapter 32. Elongated lock nut 36 preferably further comprises an externally threaded section 62 behind external flange 52 that terminates at lower end 61. The distance between annular surface 58 and lower end 61 of elongated lock nut 36 is desirably long enough to facilitate insertion of end 61 downwardly through a cooperatively sized bore in a mounting surface such as that provided by washing machine outlet box 12 (shown in FIGS. 2 and 3), to permit the attachment of a panel nut 22.

Once the panel nut has been attached to the underside of elongated lock nut 36 has shown in FIGS. 2 and 3 to secure valve 10 to washing machine outlet box 12, tubular polymeric coupling 38 is desirably attached to the portion of tubular adapter 32 that extends downwardly past lower end 61 of elongated lock nut 36. Polymeric coupling 38, preferably made of CPVC, further comprises upper and lower cylindrical wall sections 64, 70, respectively. The inside diameter of cylindrical wall section 64 is desirably sized to provide sliding engagement with that portion of outside wall 37 of tubular adapter 32 extending downwardly through elongated lock nut 36. Annular sealing surface 66 is preferably provided inside polymeric coupling 38 to provide a seating surface for lower end 74 of tubular adapter 32, and the distance between lower end 61 of elongated lock nut 36 and lower end 74 of tubular adapter 32 after annular surface 56 is seated against annular surface 58 should be greater than the distance between end wall 65 and annular surface 66 of polymeric coupling 38. Polymeric coupling 38 is desirably permanently attached to tubular adapter 32 using a conventional, commercially available solvent-type adhesive. Inside wall 70 of polymeric coupling 38 likewise has an inside diameter sufficient to receive outside wall 72 of polymeric supply line 16 in sliding engagement therewith. End 76 of supply line 16 is desirably inserted into the lower end of polymeric coupling 38 until end wall 76 abuts against annular surface 68. A permanent, leak proof bond is desirably achieved by coating outside surface 72 of supply line 16 and/or inside wall 70 of polymeric connector 38 with a solvent-type adhesive prior to making the connection.

Referring to FIG. 5, valve connector system 20 of the invention is depicted as installed for use in another application such as an icemaker outlet box. Referring to FIG. 5, water is supplied to valve 10 through valve connector system 20 as previously described and then passed through adapter fitting 78, and icemaker supply line 80, which is attached thereto by threaded nut 82.

Figure 6:
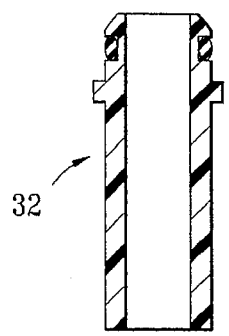
FIGS. 6–10 are cross-sectional side elevation views of alternative CPVC adapters useful in the valve connector system of the invention.
Figure 7:
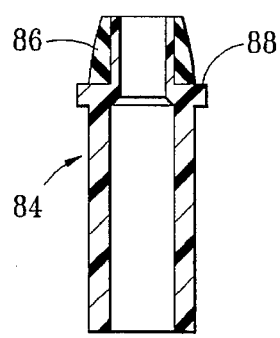

Although tubular adapter 32 as shown in FIGS. 3, 4 and 6 is a preferred structure for use in valve connector system 20 of the invention, other structures as shown in FIGS. 7 through 12 can also be utilized within the scope of the invention. Thus, for example, FIG. 7 discloses tubular adapter 84 can be captured between a valve port and elongated lock nut as described above except for the use of a cone washer 86 in place of sealing member 34 to establish sealing engagement between the tubular adapter and associated valve port. When using a tubular adapter as shown in FIG. 7, it will be appreciated that a valve port having an inside wall with geometry conforming to the outer surface of cone washer 86 is preferred.

Figure 8:
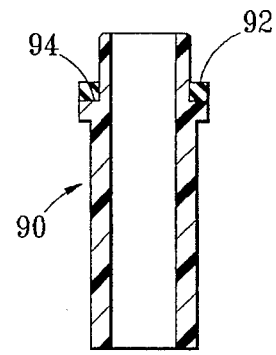

Referring to FIG. 8, tubular adapter 90 utilizes a flat polymeric washer 92, preferably made of polyethylene, seated on annular surface 94 to provide sealing engagement between tubular adapter 90 and an associated valve port.

Figure 9:
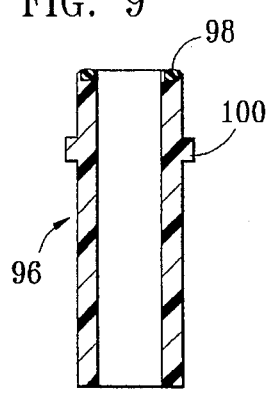

Referring to FIG. 9, tubular adapter 96 utilizes a polymeric O-ring 98 disposed in a recess on the forwardly extending end of the adapter to provide sealing engagement with a cooperating surface in a valve port whenever external flange 100 is brought into abutting contact with the end wall of the valve port as described above in relation to tubular adapter 32.

Figure 10:
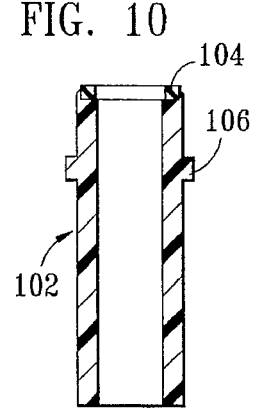

Tubular adapter shown in FIG. 10 is similar to adapter 96 shown in FIG. 9 except that flat washer 104 is substituted for polymeric O-ring 98 as the sealing member between the adapter and an associated valve port into which it is inserted until limited by external flange 106.

Figure 11:
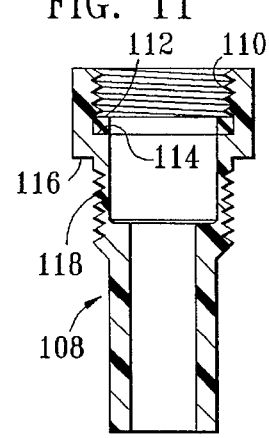
FIGS. 11–12 are cross-sectional side elevation view of alternative metal adapters useful in the valve connector system of the invention.

Referring to FIG. 11, adapter 108 desirably combines the principal structural elements of tubular adapter 32 and elongated locking nut 36 as described above into a single, unitarily molded, polymeric part that is again preferably made of CPVC. According to this embodiment, internal threads 110 correspond functionally to internal threads 54 of elongated locking nut 36 as previously described, external threads 118 are functionally equivalent to external threads 62, annular flange 116 is functionally equivalent to flange 52, and flat polymeric washer 112 provides sealing engagement between annular surface 114 and the end wall of a valve port having external threads to which threads 110 are engaged.

Figure 12:
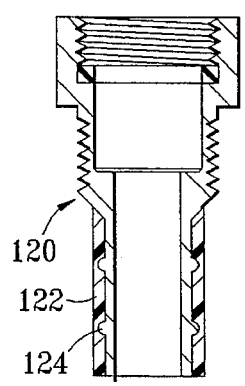

FIG. 12 depicts adapter 120 having a structure similar to that of adapter 108 as shown in FIG. 11 except that all parts other than the polymeric washer and sleeve 122 are made of metal. Sleeve 122 is preferably a polymeric material such as CPVC that is molded or press fitted onto shank 124 to facilitate permanent attachment to a polymeric coupling using a solvent-type adhesive as previously described above in relation to polymeric connector 32 and polymeric coupling 38.

Although valve connector system 20 is described herein as being a so-called "permanent" type connection as opposed to "quick disconnect" type connections, it will be appreciated by those of ordinary skill in the art upon reading this disclosure that the polymeric sealing members (whether O-rings, cone washers, flat washers, or other similarly effective articles) can be replaced if desired by removing the panel nut (if present) and then unthreaded the elongated lock nut from the valve port to permit withdrawal of the tubular adapter therefrom. Furthermore, while valve connector system 20 of the invention is described herein in relation to preferred installations inside an outlet box for appliances such as a washing machine or icemaker, it will be appreciated that similarly effective connections can be made in other applications without the use of either an outlet box or panel nut.

Other alterations and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

I claim:

1. A connector system for attaching a valve to a free end of a segment of pipe made of a polymeric material, the system comprising:

an externally threaded valve port having an inside diameter;

a tubular adapter partially insertable into the valve port, the adapter having a first end section with an outside diameter slightly less than the inside diameter of the valve port, an external annular flange having a first annular surface limiting insertion of the first end section into the valve port and a second annular surface facing away from the first annular surface, a sealing member providing sealing engagement between the first end section and the valve port, and a second end section;

an elongated lock nut comprising an axial bore having an inside diameter large enough to receive the second end section of the adapter therethrough, internal threads engageable with the externally threaded valve port to hold the sealing member of the tubular adapter in sealing engagement with the valve port, and an internal annular flange abutting against the second annular surface of the external annular flange of the adapter when the internal threads of the lock nut are sufficiently engaged with the external threads of the valve port to bring the sealing member of the adapter into sealing engagement with the valve port; and a tubular polymeric coupling having a first open end adapted to receive the second end section of the adapter in sliding engagement therewith, a second open end adapted to receive the free end of the polymeric pipe segment in sliding engagement therewith, and means for permanently attaching the coupling to the second end section of the adapter and to the free end of the pipe segment to provide a fluid-tight connection therebetween.

2. The connector system of claim 1 wherein the valve is made of a polymeric material.

3. The connector system of claim 1 wherein the valve is made of metal.

4. The connector system of claim 3 wherein the valve is made of brass.

5. The connector system of claim 1 wherein the valve is a ball valve.

6. The connector system of claim 5 wherein the valve is a quarter-turn ball valve.

7. The connector system of claim 1 wherein the valve is an angle-stop valve.

8. The connector system of claim 1 wherein the tubular adapter is made of a polymeric material.

9. The connector system of claim 8 wherein the polymeric material is CPVC.

10. The connector system of claim 1 wherein the lock nut is made of a polymeric material.

11. The connector system of claim 10 wherein the polymeric material is CPVC.

12. The connector system of claim 1 wherein the polymeric tubular coupling is made of CPVC.

13. The connector system of claim 1 wherein the polymeric pipe segment is made of CPVC.

14. The connector system of claim 1 wherein the sealing member is an O-ring.

15. The connector system of claim 1 wherein the sealing member is a cone washer.

16. The connector system of claim 1 wherein the sealing member is a flat washer.

17. The connector system of claim 1 wherein the sealing member is made of a polymeric material.

18. The connector system of claim 1 wherein the sealing member provides sealing engagement between the first end section of the adapter and the inside diameter of the valve port.

19. The connector system of claim 1 wherein the tubular adapter and the lock nut are unitarily formed as a single polymeric article.

20. The connector system of claim 1 wherein the tubular adapter and the lock nut are unitarily made of metal and wherein the second end section of the adapter further comprises a tubular polymeric shell formed around the second end section in fixed relationship thereto.

21. The connector system of claim 1 wherein the tubular adapter and the lock nut are unitarily made of metal and wherein the second end section of the adapter further comprises a tubular polymeric shell pressed onto the second end section in fixed relationship thereto.

22. The connector system of claim 1 wherein the means for permanently attaching the coupling to the second end section of the adapter and to the free end of the pipe segment comprises an adhesive.

23. The connector system of claim 22 wherein the adhesive is a solvent adhesive.

24. The connector system of claim 1 wherein the elongated lock nut further comprises an externally threaded section and an external flange disposed between the externally threaded section and the valve, the external flange having an annular surface facing away from the valve which abuts against a valve-mounting surface.

25. The connector system of claim 24 further comprising an internally threaded mounting nut that engages the externally threaded section of the elongated lock nut in facing relation to the annular surface of the external flange of the lock nut.

26. A connector system for attaching a metal valve to a free end of a segment of pipe made of a polymeric material, the system comprising:

an externally threaded valve port having an end wall and an inside wall, the inside wall defining an inside diameter;

a polymeric tubular adapter partially insertable into the valve port, the adapter having a first end section with an outside diameter slightly less than the inside diameter of the valve port, an external annular flange having a first annular surface limiting insertion of the first end section into the valve port and a second annular surface facing away from the first annular surface, a sealing member providing sealing engagement between the first end section and the valve port, and a second end section;

an elongated polymeric lock nut comprising an axial bore having an inside diameter large enough to receive the second end section of the adapter therethrough, internal threads engageable with the externally threaded valve port to hold the sealing member of the tubular adapter in sealing engagement with the valve port, and an internal annular flange abutting against the second annular surface of the external annular flange of the adapter when the internal threads of the lock nut are sufficiently engaged with the external threads of the valve port to bring the sealing member of the adapter into sealing engagement with the valve port; and a tubular polymeric coupling having a first open end adapted to receive the second end section of the adapter in sliding engagement therewith, a second open end adapted to receive the free end of the polymeric pipe segment in sliding engagement therewith, and adhesive means for permanently attaching the coupling to the second end section of the adapter and to the free end of the pipe segment to provide a fluid-tight connection therebetween.

27. The connector system of claim 26 wherein the sealing member provides sealing engagement between the first end section of the tubular adapter and the inside wall of the valve port.

28. The connector system of claim 26 wherein the sealing member provides sealing engagement between the first annular surface of the external annular flange of the tubular adapter and the end wall of the valve port.

29. The connector system of claim 26 wherein the valve is made of brass.

30. The connector system of claim 26 wherein the valve is a ball valve.

31. The connector system of claim 30 wherein the valve is a quarter-turn ball valve.

32. The connector system of claim 26 wherein the valve is an angle-stop valve.

33. The connector system of claim 26 wherein the tubular adapter is made of CPVC.

34. The connector system of claim 26 wherein the lock nut is made of CPVC.

35. The connector system of claim 26 wherein the tubular polymeric coupling is made of CPVC.

36. The connector system of claim 26 wherein the polymeric pipe segment is made of CPVC.

37. The connector system of claim 26 wherein the sealing member is an O-ring.

38. The connector system of claim 26 wherein the sealing member is a cone washer.

39. The connector system of claim 26 wherein the sealing member is a flat washer.

40. The connector system of claim 26 wherein the sealing member is made of polyethylene.

41. The connector system of claim 26 wherein the tubular adapter and the lock nut are unitarily formed as a single polymeric article.

42. The connector system of claim 26 wherein the adhesive means for permanently attaching the coupling to the second end section of the adapter and to the free end of the pipe segment is a solvent adhesive.

43. The connector system of claim 26 wherein the elongated lock nut further comprises an externally threaded section and an external flange disposed between the externally threaded section and the valve, the external flange having an annular surface facing away from the valve which abuts against a valve-mounting surface.

44. The connector system of claim 43 further comprising an internally threaded mounting nut that engages the externally threaded section of the elongated lock nut in facing relation to the annular surface of the external flange of the lock nut.

* * * * *